United States Patent [19]

Campbell

[11] Patent Number: 5,175,594
[45] Date of Patent: Dec. 29, 1992

[54] LENSMETER WITH CORRECTION FOR REFRACTIVE INDEX AND SPHERICAL ABERRATION

[75] Inventor: Charles E. Campbell, Berkeley, Calif.
[73] Assignee: Allergan Humphrey, San Leandro, Calif.
[21] Appl. No.: 509,646
[22] Filed: Apr. 16, 1990
[51] Int. Cl.$^5$ .............................................. G01B 9/00
[52] U.S. Cl. .................................. 356/124; 356/725; 356/127
[58] Field of Search ............................. 356/124–127; 351/205, 211, 212, 237, 208

[56] References Cited

U.S. PATENT DOCUMENTS

| | | |
|---|---|---|
| 4,180,325 | 12/1979 | Humphrey . |
| 4,182,572 | 1/1980 | Humphrey ........................... 356/127 |
| 4,195,909 | 4/1980 | Holle et al. ........................... 356/125 |
| 4,199,816 | 4/1980 | Humphrey ........................... 356/127 |
| 4,275,964 | 6/1981 | Vassiliadis . |
| 4,601,575 | 7/1986 | Tamaki ............................... 356/124 |
| 4,796,989 | 1/1989 | Fukuma et al. ........................ 351/212 |

OTHER PUBLICATIONS

"Fundamentals of Optical Engineering" by Donald H. Jacobs, 1943; lens aberrations, pp. 30–33 and 42–46; optical materials, pp. 91–93.

*Primary Examiner*—Richard A. Rosenberger
*Assistant Examiner*—Hoa Q. Pham
*Attorney, Agent, or Firm*—Townsend and Townsend

[57] ABSTRACT

In an automated lensmeter, provision is made for estimating dispersion when high index glasses are utilized with lenses having relatively large diopter prescriptions and for eliminating error due to spherical aberration when determining the power of contact lenses. For estimation of dispersion—typically required for optical corrections in the range of 10 diopters—two discrete color light sources are used for optical measurement of the power of the suspect lens. As a result of the obtained power difference resulting from the differing colors used, dispersion can either be estimated and referenced back to a generally accepted standard or a look-up table can be utilized to identify the specific glass class or even specific glass type being measured. In the case of the measurement of power of contact lenses, differing points of measurement through the suspect contact lenses are made. Effects of possible dispersion are ignored and differences in lens power determined with different radii of measurement. The different lens powers which are a function of radii of measurement are ascribed to spherical aberration. Once the value of spherical aberration is known, it is subtracted from the total determined prescription with the end effect that the true paraxial power of the contact lenses is determined. Provision is made for the incorporation of both the dispersion correction feature and the contact lens measuring protocol into the same instrument.

4 Claims, 3 Drawing Sheets

LENSMETER WITH CORRECTION FOR REFRACTIVE INDEX AND SPHERICAL ABERRATION

BACKGROUND OF THE INVENTION

1. Field of the Invention

This application relates to automated lensmeters and particularly to a lensmeter which has been adapted for detecting dispersion of high index of refraction lens and the measurement of lens power of contact lens at varying radii for determining spherical aberration inherent in contact lens.

2. Statement of the Problem

Automated lensmeters have an obvious advantage over their human operated counterparts. When these instrument operate properly, they are not subject to the human factors of error. In short, the machines do not become tired and are never bored. They complete their automated tasks giving constantly consistent measurement.

Two areas of measurement have caused problems for such automated lensmeters. First, there is the problem caused by the increasing use of high index glasses with their accompanying chromatic optical dispersion (hereinafter dispersion). Secondly, the measurement of contact lenses is accompanied by spherical aberration.

Regarding the use of high index glass, cataract operations and certain malformations (and diseases) of the eye require the use of relatively high optical prescriptions in the range of 10 diopters. Where such high optical prescriptions are utilized, it is common to use high index glass. Such high index glass has the beneficial result of enabling relatively thin lenses to generate the relatively high power optical corrections required. For example, over ordinary Crown glass, a high index glass can have a thickness reduced by as much as 60%.

Unfortunately, such high index glasses have the undesirable effect of having relatively high levels of dispersion. Dispersion is the chromatic dependent property of the glass to deflect to varying degree optical wavelengths of differing colors. Unfortunately, in the case of automated lensmeters, this property of dispersion can lead to optical error in the obtained measurement for high-power optical lenses.

The sources of these errors can be easily understood. Typically, automated lensmeters utilize essentially monochromatic light sources to effect measurement. For example, measurements can be taken in the red (660 nanometer wavelength) or the near infrared (880 nanometer wavelength). Utilizing these particular wavelengths, deflections in sphere, cylinder, prism and axis are determined.

It goes without saying that the human eye does not observe in the same essentially monochromatic wavelengths utilized by such optical instruments. Specifically, observation of the human eye occurs in so-called "white" light. International standards therefore reference the measurement of the deflection of eyeglass lenses to performance at wavelengths differing from the sampling wavelengths of the lensmeters. These wavelengths are either in the yellow (587 nanometers) or green (546 nanometers).

When such automated lensmeters are initially calibrated with "standard" lenses, adjustment for the difference between the sampling wavelength and the so-called "white" light standard applicable to ordinary human observation occurs naturally in the calibration procedure. By the expedient of having the automated lensmeter "remember" in its measurement protocol how relatively regular optical prescriptions deflect light when sampled at the discrete sampling frequencies, accurate and fast determination of the prescriptions of normal range suspect optical elements can be made.

Unfortunately, when so-called high-power optical corrections are measured—especially when high index glasses are utilized—the ordinary offsets between the measuring color of the instrument light source and the actual color dependent deflection of the lens increases. Further, since the high index optical glasses change the dispersion relationship between the sampling color and the monochromatic sampling light, the ultimately determined optical prescription can contain error. Such error can be in the range of 0.1 diopter—an unacceptable error for accurate vision. Accordingly, there is a need to measure and determine dispersion and to use the measured dispersion to correct the final prescription generated by the instrument.

Automated lensmeters are also finding use in measuring the optical powers of contact lenses. Contact lenses—as worn on the eye—typically have relatively high optical curvatures which enable the lens to be captured to and essentially rest on the moist surface of the eye. These high optical curvatures change as the size of the human eye changes. As is well known to all who wear contact lenses, different size eyes require different curvatures for satisfactory lens fitting.

When contact lenses are properly fitted and properly positioned on the eye of a wearer, the relatively high curvatures utilized in fitting the lenses to the eye do not appreciably effect the ultimate optical prescription of the central portion of the lens. Specifically, and because of the lack of an air to lens interface on the negative surface of the eye where the eye and lens meet, spherical aberration is essentially absent in so far as the prescribed patient is concerned.

Unfortunately, this is not the case when the power of such lenses are determined by a lensmeter. The eye-to-lens interface at the negative surface of the contact lens is missing. In the place of the eye-to-lens interface there is substituted an air-to-lens interface. And with the introduction of this air-to-lens interface, spherical aberration is introduced into the automated lensmeter reading.

Spherical aberration with respect to such contact lenses can be easily understood. Assume that an accurate optical measurement could be made along the central axis of a contact lens. This central axis measurement can be referred to as a paraxial measurement. When, however, a highly curved lens is measured at points other than its optical center, the power of the lens changes as a function of the of the point of actual lens measurement from the lens center. This change in lens power is a function of the curvature of the lens. This change is referred to as the spherical aberration of the lens. Since this aberration is present only when the lens is measured in air, and absent when the lens is worn on the eye, determination and elimination of this effect from the measured power of a contact lens is highly desireable.

Unfortunately, and in order to determine the full power of a lens, measurement of the deflection of the lens must occur at more than one point on the lens. Indeed, for an accurate measurement to be made of a lens in sphere, cylinder and axis, measurements must be made at least three points through the lens. Further, it is common to make such measurements in as many as four points on the lens. Naturally, only one of these points can be at the paraxial or central portion of the lens. The remaining measurement points simply have to be removed from the center of the lens. And when such removal from the center of the lens occurs, the effects of spherical aberration are inevitably introduced into the measurement.

It will be understood that the understanding of the problem to be solved can constitute at least a portion of the following invention. Accordingly, in so far as understanding of the problem to be solved can constitute invention, invention is claimed.

SUMMARY OF THE INVENTION

In an automated lensmeter, provision is made for estimating dispersion when high index glasses are utilized with lenses having relatively large diopter prescriptions and for eliminating error due to spherical aberration when determining the power of contact lenses. For estimation of dispersion—typically required for optical corrections in the range of 10 diopters—two discrete color light sources are used for optical measurement of the power of the suspect lens. These different color light sources are of sufficiently differing wavelengths to obtain different measurements of lens power as a function of optical dispersion at each chosen wavelength. As a result of the obtained power difference resulting from the different colors used, dispersion can either be estimated and referenced back to a generally accepted standard or a look up table can be utilized to identify the specific glass class or even specific glass type being measured. In the case of the measurement of power of contact lenses, different points of measurement through the suspect contact lenses are made. Effects of possible dispersion are ignored and differences in lens power determined with different radii of measurement. The different lens powers, which are a function of different radii of measurement, are ascribed to spherical aberration. Once the value of spherical aberration is known, it is subtracted from the total determined prescription with the end effect that the true paraxial power of the contact lenses is determined. Provision is made for the incorporation of both the dispersion correction feature and the contact lens measuring protocol into the same instrument, with spherical aberration being ignored when spectacle lenses are measured and dispersion being ignored when contact lenses are measured.

OTHER, OBJECTS, FEATURES AND ADVANTAGES

An object of this invention is to enable a lensmeter useful for the measurement of ordinary optical prescriptions to have utility in the measurement of spectacles having relatively high optical corrections in the range of 10 diopters. It will be understood that such lenses typically utilize various kinds and varieties of high index glasses all containing initially unknown values of optical dispersion. According to this aspect of the invention, measurement of the suspect lenses occurs in at least two essentially discrete, separate and essentially monochromatic wavelengths. The wavelengths selected have sufficient band separation so that all expectably encountered values of dispersion produce correspondingly different values of deflections (lens power). By the expedient of measuring the different values of deflection as a function of the interrogating wavelength used, estimates of the dispersion present can be made. When dispersion is properly estimated, reference of the measured lenses to their standard optical "white light" equivalents can be made with the elimination of significant error in the finally determined optical prescription.

An advantage of this aspect of the invention is that changes in dispersion in high index glass—while not precisely predictable—can be approximated. Such approximations enable sufficient accuracy in lens measurement to enable optically accurate prescriptions for a patient well within the visual tolerances of acceptable corrected human vision.

A further aspect of this invention is that the changes in power due to optical dispersion can be utilized to identify the particular high index glass or glass classification utilized for the required optical prescription. Once the actual glass utilized in the lens is properly identified, accurate determination of the optical prescription can easily follow.

An additional object of this invention is to disclose a protocol for the removal of spherical aberration when measuring the power of contact lenses. According to this aspect of the invention, measurement of the power of the contact lenses occurs from at least a duplicity of points. Such measurement, unlike the measurement of dispersion, may be made at the same wavelength. Different lens power measurements which are solely a function of the particular radii of lens measurement are identified. Thereafter, spherical aberration is determined, and eliminated from the contact lens measurement.

A further object of this invention is to disclose an instrument design for a lensmeter in which the both the protocol for the determination of dispersion in high index of refraction glasses and the protocol for the elimination of the effect of spherical aberration in the measurement of contact lenses are relatively easily combined. According to this aspect of the invention, where ordinary or high optical prescription spectacles are measured, the effects of spherical aberration are ignored as diminius. Where contact lenses are measured, dispersion is ignored. In the measurement of contact lenses, a preferred means of ignoring dispersion is disclosed by signaling to the measuring lensmeter the presence of a contact lens. In both cases, a truly versatile lensmeter is disclosed that extends normal lensmeter functions to both the high index glass and contact lens domains.

DETAILED DESCRIPTION OF THE DRAWINGS

Figure 1A:
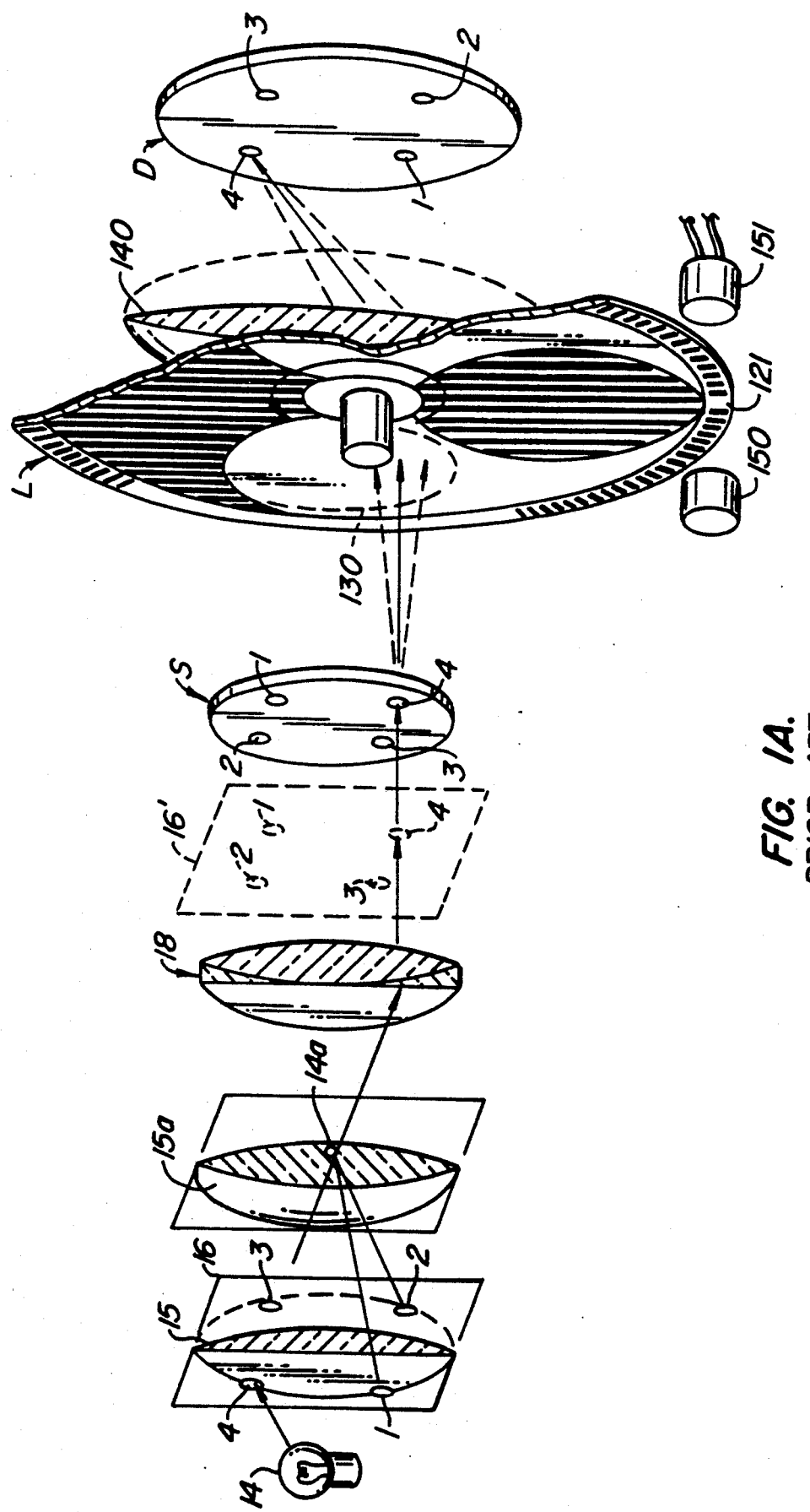
Figure 1B:
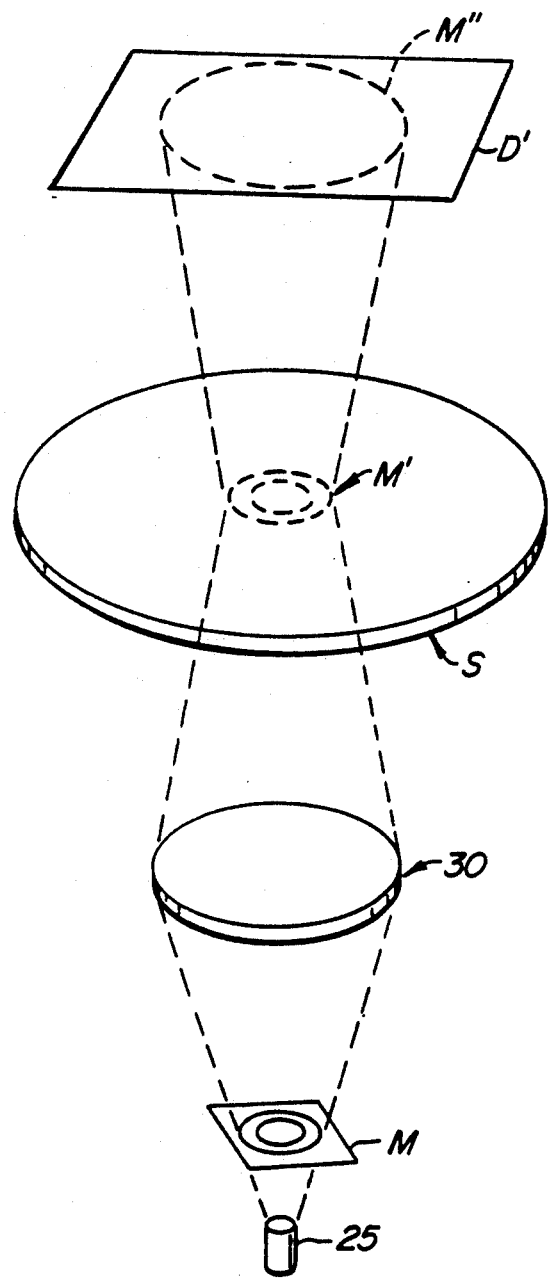
Figure 2A:
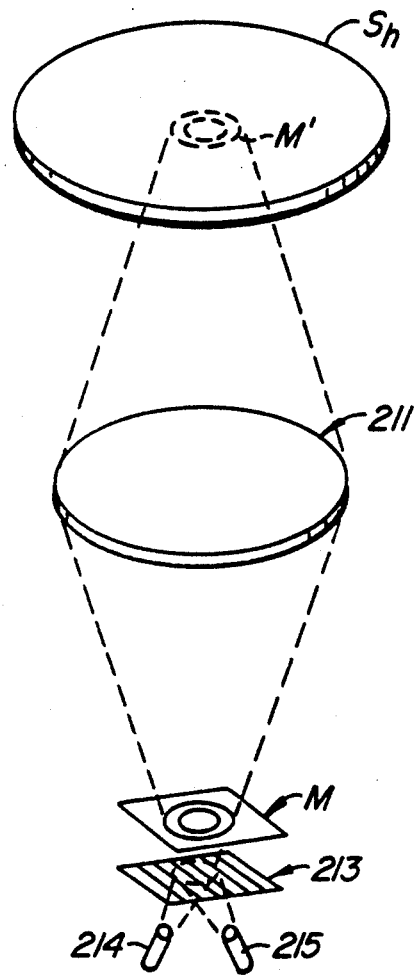
Figure 2B:
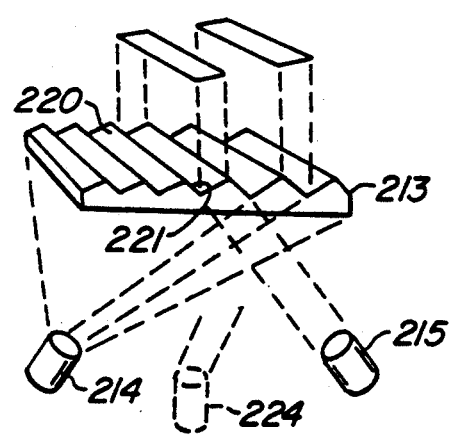
Figure 2C:
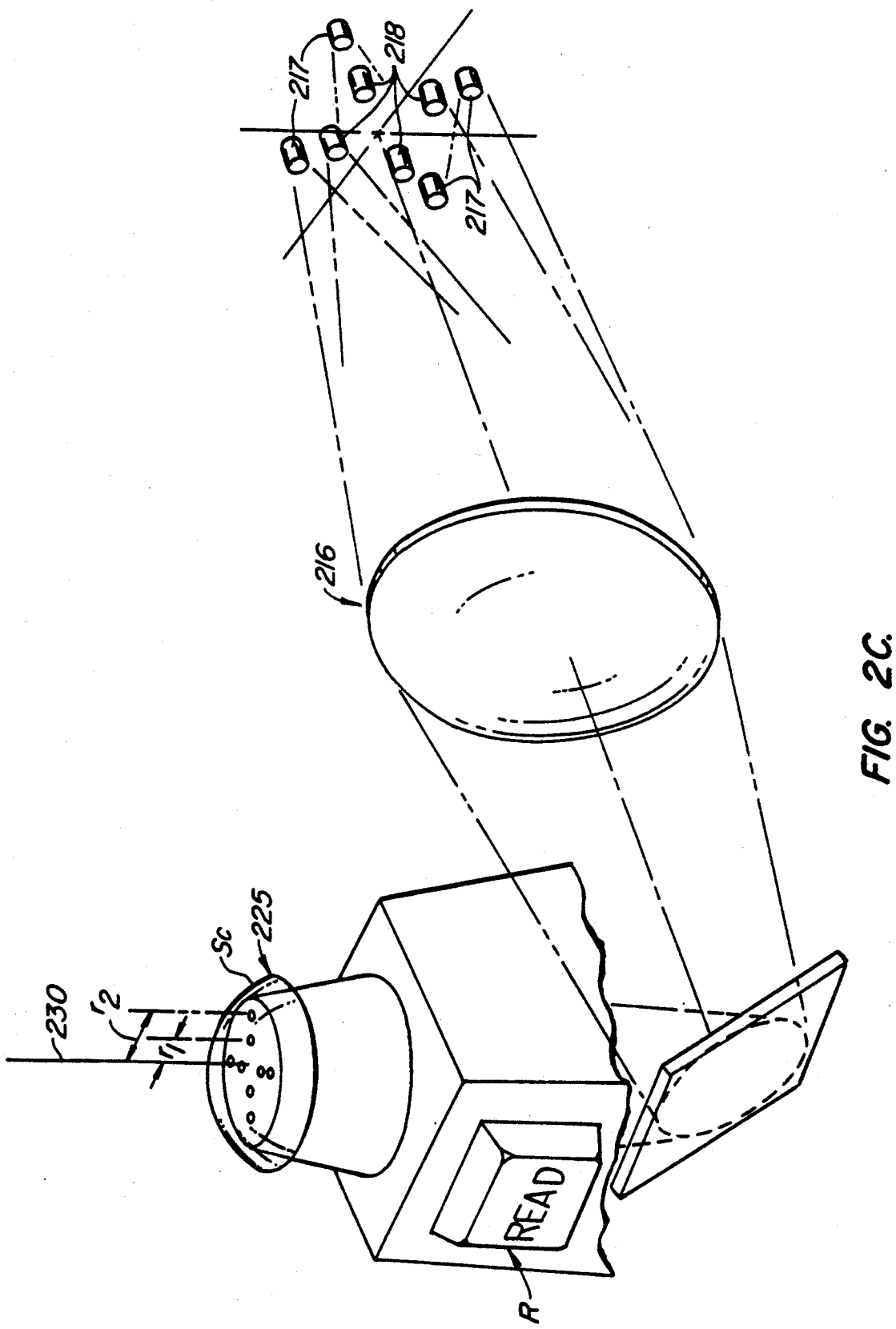

FIG. 1A is a reproduction of FIG. 1A from U.S. Pat. No. 4,180,325 entitled Lensmeter with Automated Read Out issued Dec. 25, 1979 setting forth a type of lensmeter and the associated automated determination of suspect optical system power with which this invention may be utilized;

FIG. 1B is an illustration of a prior art lensmeter of the type wherein a target mire is projected over a substantial portion of an ordinary eyeglass lens and an image is projected through a substantial area of the lens for observation of the image after deflection at the suspect lens to determine optical prescription of the suspect lens in sphere, cylinder, axis and prism, this prior art system being illustrative of that described in U.S. Pat. No. 4,275,964 issued June 30, 1981;

FIG. 2A is an illustration of a dual-color light source utilized in a lensmeter of the type utilized in FIG. 1A with the resultant capability of the correction of measured prescription for determined optical dispersion;

FIG. 2B is a detail of FIG. 2A of the projection of the dual-color light sources through a prism network to give each discrete-color light source an apparent identical point of origin with respect to the suspect optics; and, FIG. 2C is a detail of the utilization of parallel, monochromatic light sources projected to a suspect lens at varying radial locations for the determination and elimination of spherical aberration from the ultimately determined measurement, this measurement having specific utility for contact lenses.

Referring to FIG. 1A, a prior art lensmeter is described. This prior art lensmeter is taken from Humphrey U.S. Pat. No. 4,180,325 issued Dec. 25, 1979.

In this disclosure an essentially monochromatic light source 14 projects an image through a screen 16. Screen 16 includes apertures 1, 2, 3, and 4 which apertures form essentially monochromatic point sources of light.

A lens 15 in combination with lens 15A and 18 relays a conjugate image of the light sources to a plane 16'. These respective light sources in their relay are projected through a common pupil 14A in optics 15A and projected in a collimated format from optic 18 onto the suspect optical system S. The images of the respective light sources 1–4 can be seen in a conjugate image plane 16' at the respective points 1–4. These points shown as point sources of light.

A moving boundary locus L rotates and its position of rotation is measured by timing marks 121 passing between a light source 150 and a detector 151. Each of the points of light undergoes deflection in an area of excursion denominated 130, this area of excursion overlying the rotating moving boundary locus L. Respective point sources of light at the suspect optics S are deflected by a lens 140 to complementary labeled apertures 1–4 in a detector D. This patent sets forth at some length how the respective deflections at the moving boundary locus L are converted to lens prescriptions.

It will be understood that moving boundary locus L and the detector D are apparatus for measuring the deflection of light. Once the deflection of light is measured, a computer, the program for which is disclosed in the above-entitled application, converts the deflections into values of spheres, cylinder, axis, and prism.

In the invention hereinafter, it will be assumed that the reader is familiar with this type or equivalent of lensmeter.

Similarly, and referring to FIG. 1B, a second type of lensmeter is disclosed. In this lensmeter a light source 25 projects light through a mask M. An image of mask M is relayed by optics 30 to the suspect optics S. This image of the mask M appears at M' at the suspect optics and is relayed to a detector D'. The detector D' here is preferably a charged coupled device. Use of such a device is generally shown and described in U.S. Pat. No. 4,275,964 issued June 30, 1981.

In summary form, the size and shape of the image M" relayed to the charged coupled device detector D' is analyzed. Assuming that the shape of the mass M was originally a circular shape, by the analysis of the shape M" appearing on the detector D' with computer controlled logic connected to the charged coupled device D', analysis of the lens power of the suspect optical system S can be made in sphere, cylinder, axis and prism.

Again, it will be assumed hereinafter that the reader is familiar with this reference and its stated operability.

Having set forth the operation of the prior art, the invention herein will be explained. First, and with reference to FIGS. 2A and 2B, the use of monochromatic light bands of different wavelengths to measure dispersion in high index suspect optics will be explained. Thereafter, and with reference to FIG. 2C, the use of multiple light sources all of the same wavelength will be shown in analyzing the power of a contact lens. In each case, only the optics between the light sources and the suspect optics will be considered. It will be assumed that the reader is fully familiar with the prior art of FIGS. 1A and 1B.

Referring to FIG. 2A, a first light source 214 and a second light source 215 are utilized. Referring to FIG. 2B, it can be seen that these light sources are incident upon a prism grating 213.

Prism grating 213 has respective facets 220 and 221 which facets repeat longitudinally of the prism array. Typically the facets are each aligned normal to the angles of incidence of the lights 214, 215.

It will be understood that light sources 214, 215 are of different and discrete frequencies. Specifically, I prefer to use one light source in the near infrared (about 880 nanometers) and the remaining light source in the visible red (about 660 nanometers).

The reader will further appreciate that any lens readings have to be reduced to the so-called "white light" standard utilized with conventional lens. For example, the power of the prescription of the suspect optics S must be corrected to either a yellow (587 nanometer standard) or a green (546 nanometer standard).

Referring to FIG. 2B, those skilled in the optical arts will realize that the prism grating of 213 will give to each of the respective light sources 214, 215 an apparent point of origin. Specifically, facets 220 will impart to light source 215 an apparent point of origination at 224.

Similarly, prism facets 221 will impart to light source 214 the same point of origin 224. Thus it will appear at mask M that paired but dual colored light sources illuminate the mask.

Typically, an optic 211 is placed intermediate the high index suspect optical system $S_h$. The purpose of this optic is to relay the image of the mask M to a position M'. At the position M', the image will be projected through the optical system $S_h$ downwardly onto the charged coupled detector D'. (See FIG. 1B)

At the charged coupled detector, there will be two images and not one image. The first image will be the result of the light of light source 214, this light source operating in the 660 nanometer wave length.

The second image will be the image of the mask in the range of near infrared, about 880 nanometers. Conventional measurements of power will then be made and computed as set forth in U.S. Pat. No. 4,796,989. At the end of this computation, however, two discrete powers will be determined. These powers will be different for each measured wavelength.

In general the power of a lens is proportion to (n−1) where n is the index of refraction. So if the index of refraction at the first wavelength is $n_1$ and the index of refraction at the second wavelength is $n_2$, the respective measured powers can be given by the formulae:

$$P_1 = (n_1 - 1)C;$$
$$P_2 = (n_2 - 1)C;$$

The term C is commonly known as the curvature of the lens and is a function solely of its radii of curvature and thickness and does not depend in any way on its index of refraction. A ratio formed of these measured powers can be seen to be a ratio involving only the indices of refraction:

$$\frac{P_1}{P_2} = \frac{(n_1 - 1)}{(n_2 - 1)}$$

This ratio is characteristic of the material of the lens. In the memory of the automatic lensmeter characteristic ratios for various lens materials used are stored. When the ratio for a given lens under test is determined, this value is compared to the table of known values to identify the material of the lens under test. For each material there is also stored a correction factor that corrects the power value at the measured wavelength to the power value at the desired wavelength. This factor is automatically applied and the corrected value displaced.

As an example two well-known glass types used for spectacle lenses, spectacle crown and SF64 (Schott Optical Glass Inc.) a high index, high dispersion glass and consider two essentially monochromatic light sources, one at 852.1 nanometers (s line) and one at 656.3 nanometers (C line). The indices of refraction are as follows:

|  | $n_s$ | $n_c$ | $P_1/P_2$ |
|---|---|---|---|
| Crown | 1.515 | 1.520 | .990 |
| SF64 | 1.688 | 1.699 | .984 |

So if a crown lens were found to have a power of 10 diopters at the C line, it would have a power of 9.90 diopters at the s line. Likewise, if a lens made of SF64 were found to have a power of 10 diopters at the C line, it would be found to have a power of 9.84 diopters at the s line. Differences of least magnitudes are easily detected with modern, high precision automatic lensmeters.

Returning to FIG. 2C a first array of four monochromatic light source points 218 is disclosed. A second and outside array 217 of point light sources are set forth. A relay optic 216 relays images 225 of the respective light sources to a suspect contact lens $S_c$. Again, measurement of the power of the lens first occurs using light sources 218. Thereafter, measurement of the power of the lens occurs using light sources 217.

Referring to lens $S_c$ it can be seen that an optical axis 230 has been drawn through the central or paraxial portion of the lens. It is the power of the lens at this central or paraxial portion which is sought.

It can further be seen that each of the images of the respective light sources 218 is removed from the paraxial location 230 by a first radius $r_1$. Further, it can be seen that each of the images of the light sources 217 is removed from the paraxial center of the lens by a second and larger radius $r_2$. This being the case, the power of the suspect contact lens $S_c$ is determined at two distinct radii $r_1, r_2$.

When the lensmeter is designed with two base legs and is operating in the contact lens mode so that spherical aberration is expected, measurements are made with each base leg resulting in two values for power $P_1$ and $P_2$. It is known that the zonal power of lensiin zone of radius, r, in the case of primary spherical aberration can be approximated by the expression.

$$P = P_o + a(P_o r)^2$$

In this expression, $P_o$ is the paraxial power of the lens, r is the zonal radius and a is a value which characterizes the amount of spherical aberration. Since the two zonal radii are set by the size of two patterns used, they are known values, $r_1$ and $r_2$. Using these values and values $P_1$ and $P_2$ it is straight forward to solve for paraxial power, $P_o$. The final expression is:

$$P_o = \frac{P_1 r_2^2 - P_2 r_1^2}{r_2^2 - r_1^2}$$

The reader will recognize that I have disclosed the equations for relating the respective powers for the determination of dispersion and the determination of spherical aberration. Realizing this, I have not disclosed the actual manipulation of the powers in a computer program to obtain the ratios necessary for the detection of the degree of dispersion or the solution for the paraxial power of the suspect contact lens. It will be understood that I leave these solutions to the routineer. For example, a novice engineer can effect such programming. A button "R" bearing the legend "READ" appears. When depressed, the connected computer only measures spherical aberration; dispersion is ignored. When the button is not depressed, only dispersion is measured; spherical abberation is ignored.

What is claimed is:

1. In a lensmeter for the automated testing of a contact lens having in combination:
   at least one light source having a discrete color;
   means for holding said contact lens to be tested, said contact lens operable in a visual spectrum;
   optical means for projecting an image of said light source to said contact lens to be tested;
   means for measuring the deflection of the light source image at the contact lens being tested; and,
   means for the determination of the optical power of said contact lens to be tested from said determined deflection of said light source image, the improvement to said lensmeter comprising in combination:
   optical means for projecting an image of said light source to said contact lens to be tested at a first radius from the central portion of said lens;
   optical means for projecting an image of said light source to said contact lens to be tested at a second radius from the central portion of said lens;
   means for determination the optical power of said contact lens to be tested from said determined deflection of said light source image at said first radius from the central portion of said lens;
   means for determination the optical power of said contact lens to be tested from said determined deflection of said light source image at said second radius from the central portion of said lens;
   means for eliminating power determinations which vary as a function of said first and second radii by comparing said power at said first radius from the central portion of said lens with respect to said power at said second radius from the central portion of said lens whereby the power of said contact lens at said central portion of said lens is determined independent of power of spherical aberration varying as a function of radius from the central portion of said lens.

2. The lensmeter of claim 1 and including a first plurality of light sources at a first radius from said contact lens; and a second plurality of light sources at a second radius of said lens.

3. The lensmeter of claim 2 and wherein one of said arrays of light sources includes a mulitcolor light source.

4. A method for using a lensmeter for the automated testing of a suspect contact lens optical system comprising the steps of:

providing a first light source for measuring the power of said suspect contact lens at a first radius with respect to the central portion of said lens;

providing a second light source for measuring the power of said suspect optical system at a second radius with respect to the central portion of said lens;

providing optics for projecting images of said first and second light sources to a suspect contact lens system;

projecting said images of said light sources to said suspect contact lens system whereby a first image is projected at a first radius of said suspect contact lens system from the central portion of said contact lens and a second image is projected at a second radius of said suspect contact lens system from the central portion of said contact lens;

eliminating power determinations which vary as a function of said first and second radii by comparing said power at said first radius from the central power of said suspect contact lens with respect to said power at said second radius from the central portion of said suspect contact lens whereby the power of said suspect lens at said central portion of said lens is determined independent of power of spherical aberration varying as a function of radius from the central portion of said lens.

* * * * *